July 27, 1954  J. F. FURCINI  2,684,594
LOAD WEIGHING AND SUPPORTING MECHANISM
Filed Oct. 5, 1951  2 Sheets-Sheet 1

James F. Furcini
INVENTOR.

July 27, 1954

J. F. FURCINI 2,684,594

LOAD WEIGHING AND SUPPORTING MECHANISM

Filed Oct. 5, 1951

James F. Furcini
INVENTOR.

BY *Clarence A. O'Brien*
*and Harvey B. Jacobson*
Attorneys

Patented July 27, 1954

2,684,594

UNITED STATES PATENT OFFICE 2,684,594

LOAD WEIGHING AND SUPPORTING MECHANISM

James F. Furcini, Clairton, Pa.

Application October 5, 1951, Serial No. 249,915

2 Claims. (Cl. 73—414)

This invention comprises novel and useful improvements in a load weighing and supporting mechanism and more specifically to a load weighing and supporting mechanism consisting of a hydraulic attachment adapted to be associated with the dump body and the supporting frame elements of a truck in an improved manner to enable the continuous weighing and indication of the weight of the load upon the body and to support the body and its load in an improved manner upon the chassis of the truck.

The hereinafter to be described invention is generally similar to but constitutes an improvement over the apparatus set forth and claimed in my co-pending application, Serial No. 217,435, filed March 26, 1951, for Load Weighing and Supporting Mechanism.

The primary objects of the present invention are to provide an improved and simplified combined load supporting and weighing device of the closed system or self-contained hydraulic system type and which shall be specifically adapted for use with trucks and truck bodies, especially of the vertically pivoting dump type; which may be readily applied to conventional dump trucks with a minimum requirement for labor and alterations of the conventional truck constructions; which will mount a truck body upon a truck chassis with a cushioning of the load of the body upon the chassis.

A further object of the invention is to provide a mechanism as set forth in the preceding objects wherein each of a plurality of portions of the truck body is supported by a separate hydraulic column and wherein this hydraulic column is sealed or closed without the necessity for replacing or adjusting the hydraulic fluid therein.

Yet another object of the invention is to provide a mechanism as set forth in the foregoing objects wherein each of the hydraulic columns is provided with its own individual pressure responsive gauge element together with a novel gauge construction combining all of these elements for effecting a resultant total reading of the individual loads of the hydraulic columns.

These, together with various ancillary features and objects of the invention, which will later become apparent as the following description proceeds, are attained by the present invention, a preferred embodiment of which has been illustrated, by way of example only, in the accompanying drawings, wherein.

Figure 1:
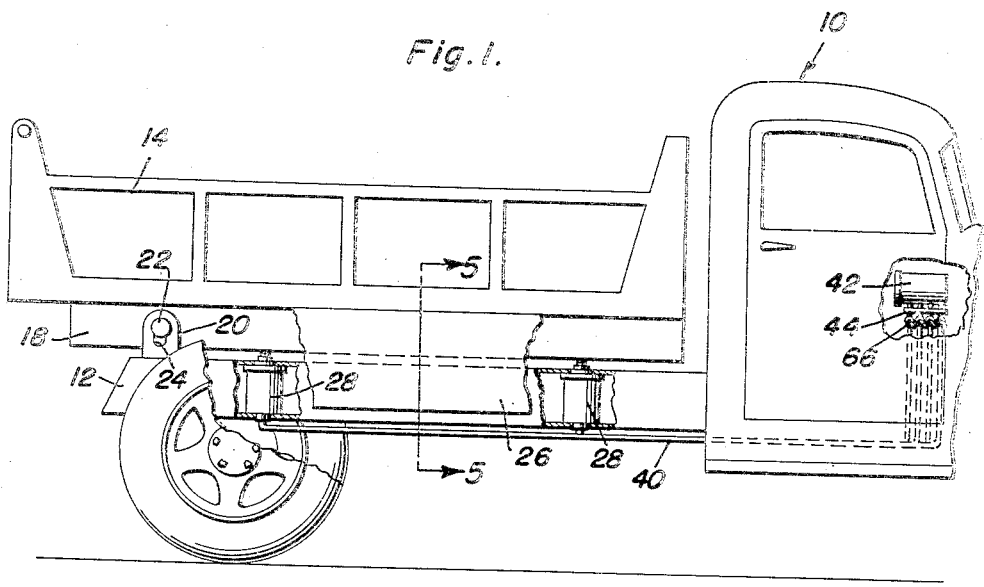
Figure 1 is a fragmentary side elevational view showing a conventional form of dump truck to which the principles of this invention have been applied, parts being broken away and shown in dotted lines, the body being shown in its lowered position with the weight of the body supported by the hydraulic columns during normal operation of the device.
Figure 4:
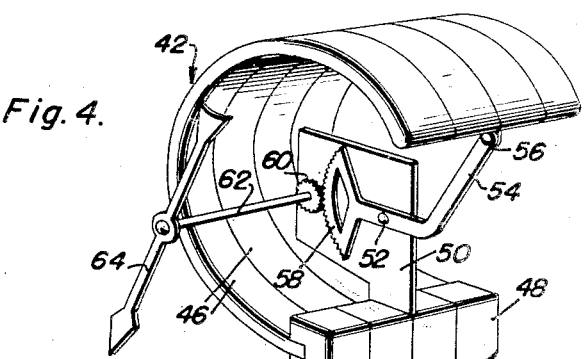
Figure 5:
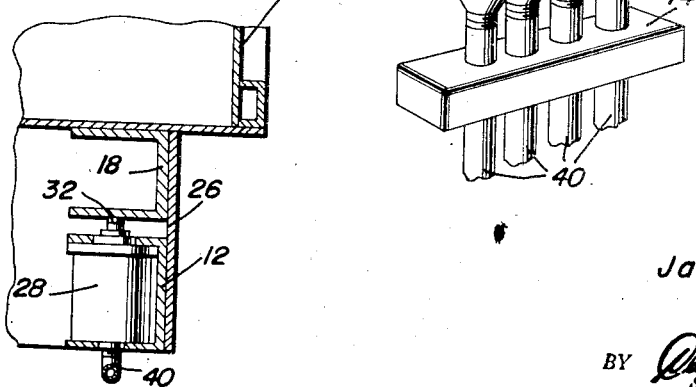

Figure 4 is a perspective view of the novel weighing scale and its connection with the individual hydraulic columns constituting the load supporting means of the present invention; and, Figure 5 is a vertical transverse sectional view taken upon an enlarged scale substantially upon the plane indicated by the section line 5—5 of Figure 1 and illustrating the manner in which one of the jack units of a hydraulic column is mounted upon the frame elements of the truck.

Referring now more specifically to the accompanying drawings, wherein like numerals designate similar parts throughout the various views, the numeral 10 indicates generally a conventional form of dump truck having the customary chassis including the customary channel iron members 12 constituting supporting members of the chassis, and which normally receive and support a truck dump body 14.

The bottom of the dump body 14 is carried by longitudinally extending channel iron beams 18 constituting bolsters, and which normally are adapted to rest upon the support members 12 when the truck body is in its lowered position.

In accordance with conventional practice, the support members 12 are provided with fulcrum or hinge brackets 20 adjacent their rear ends which are apertured to receive pivot pins 22 by means of which the rear portions of the bolsters 18 are pivotally supported upon the support members 12 to permit vertical pivoting movement of the body 14 during the dumping operation of the same. It is of course understood that the usual column mechanism is provided for effecting the tilting or dumping movement of the body about the pivot pins 22, but since this mechanism is of conventional design, illustration and description of the same are believed to be unnecessary.

The basic or fundamental concept of this invention resides in operatively interposing between the support members 12 and the bolsters 18 of the body 14 a hydraulic system and mechanism by means of which the body 14 is floatingly mounted upon the support members 12 by means of hydraulic columns, rather than having the bolsters 18 directly engaging and resting upon the members 12, both to improve the distribution and support of the load of the body upon the support members and also to enable easy ascertaining of the weight of the body and its contents.

In accordance with this invention, and as set forth and claimed in my above-identified co-pending application, the hinge connection of the body to the support members at 22, 20, is slightly modified so as to permit a vertical rectilinear reciprocation, to a limited extent, of the body with respect to the support members. For this purpose, the aperture in the fulcrum bracket 20 receiving the pivot pin 22 is vertically slotted at 24 so as to permit the hinge pin 22 to be capable of a limited vertical rectilinear reciprocation with respect to the bracket 20. Thus, by virtue of the slot 24, the entire body 14 is capable of a limited vertical displacement as set forth hereinafter, while remaining in a position parallel to its rest position and with respect to the upper surface of the support members 12 upon which the body normally rested before the introduction of the attachment of the present invention. However, it should be particularly noted that the normal tilting or pivoting of the body to effect its dumping action is in no way impaired by the present invention.

Since the body is floatingly mounted upon the support members 12 when the present invention is applied thereto, it is deemed preferable to provide guiding and retaining means to prevent sidewise movement of the body with respect to the support members when the former is elevated above the latter by the use of this invention. For this purpose, the body has welded or otherwise fixedly secured thereto depending plates 26 which are likewise secured to the sides of the bolsters 18, as also shown in Figure 5, and which plates are adapted to slidingly embrace the outside vertical surfaces of the support members 12 when the body is at or near its lowered position. The plates 26 serve as guides during the raising and lowering tilting movement of the body; serve as retainers to prevent sidewise or lateral displacement of the body with respect to the support members; and finally, serve as a housing or protective means for the hydraulic weighing and supporting mechanism which is operatively connected with the body and support members, as set forth hereinafter.

The guard plate construction 26 likewise is disclosed and claimed in my above-identified co-pending application and in itself forms no part of the invention claimed in the present application.

The hydraulic supporting and weighing assembly forming the subject of this invention, consists of a plurality of cylinder and piston jack units, each indicated generally by the numeral 28 and which are operatively connected between the bolsters 18 of the truck body and the support members of the truck chassis for supporting the former upon the latter. In the present invention, the hydraulic assembly further includes an individual hydraulic conduit for each of the jack units together with a composite gauge having an individual pressure-responsive element connected with each hydraulic column and means for totalizing the loads of each hydraulic column to provide a composite reading for the entire system.

Any desired number of jack units may be employed, and it is to be understood that the illustration depicting four such units, one disposed adjacent each corner of the truck body, is merely illustrative of the principles of this invention, since various numbers of jack units may be distributed over the truck chassis to support the truck body at any desired positions.

The jack units 28 may be of any known and conventional construction, since the principles of this invention are not limited to any particular construction of jack. It is of course contemplated within the spirit of this invention that the particular jack unit set forth and disclosed and claimed in my co-pending application may be utilized in the present invention. For purposes of illustrating the manner in which a jack unit is utilized in the present invention, it will be understood by reference to Figures 1, 3 and 5, that each unit comprises a hydraulic cylinder 30 having a piston or other pressure responsive means therein, not shown, which is vertically reciprocable within the cylinder 30 and has an upstanding adjusting screw 32 therein provided with a lock nut 34. This adjusting screw extends through a removable cylinder head or closure 36. The upper end of the adjusting screw 32 constitutes an abutment surface, which as clearly shown in Figure 5 is adapted to abut the undersurface of the bolster 18, the jack unit itself being indicated as mounted within the channel of the frame member 12.

It will be evident that the jack units can be attached to the support members in any desired manner, either by recessing the same within the support members as disclosed in Figure 5; by mounting the same upon suitable support brackets on the sides of the support members or in any other desired way, the invention being not limited to any particular manner of mounting and applying the jack units. It is merely sufficient for the purposes of this invention that the jack unit shall be interposed operatively between the support members 12 and the bolsters 18 with the piston adjusting members 32 engaging the bolsters whereby when the hydraulic system including the jack is filled with hydraulic fluid, the bolsters will be carried by this hydraulic system and will be vertically elevated and supported thereon slightly above but out of contact with the support members.

Figure 2:
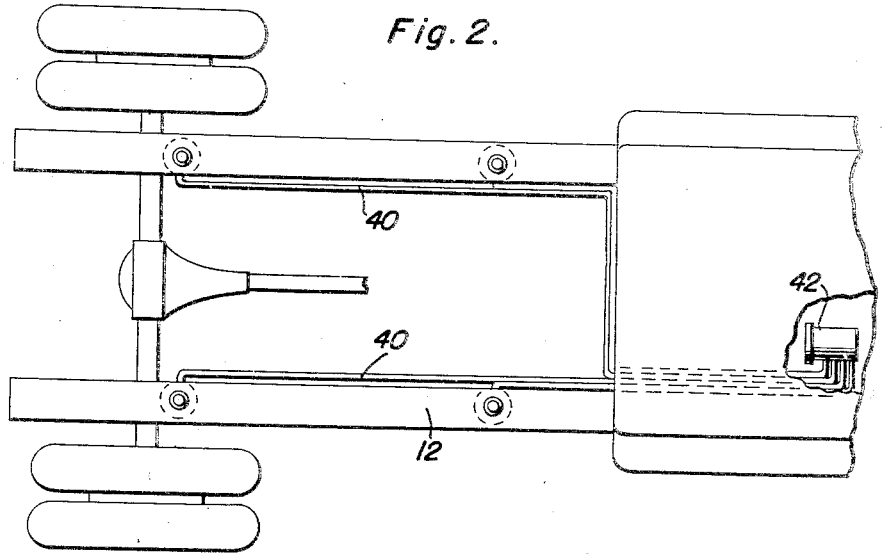
Figure 2 is a fragmentary top plan view of a portion of the truck chassis of Figure 1, the body being removed and parts being removed and broken away.
Figure 3:
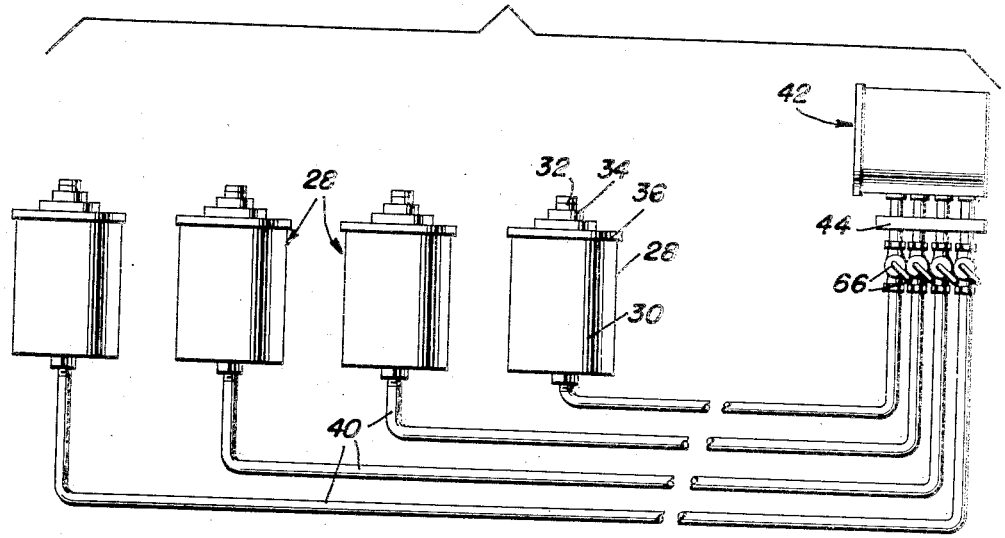
Figure 3 is a diagrammatic view, parts being broken away, of the hydraulic weighing and load supporting attachment forming the subject of this invention.

As shown in Figures 2 and 3, each of the jack units 28 has the lower end of its hydraulic chamber connected by a fluid conduit 40 with a gauge member designated generally by the numeral 42.

The gauge unit 42, whose specific construction is best shown in Figure 4, is mounted in a convenient position upon the truck, as for example in the cab of the same as shown in Figures 1 and 2. Each of the individual conduits 40 is led up into the cab of the truck, each having its upper end extending through apertures in a supporting bracket 44 slidably mounted in the cab. Each conduit is connected with a closed gauge element 46 of the arcuate, bending tube type. Conveniently, each of these elements is in the form of a flattened tube disposed in arcuate formation with one end closed and the other end attached to and communicating with a cap 48 screw threaded upon the end of a conduit 40. Thus, the load imposed upon the fluid in each conduit will cause a corresponding flexing movement of the associated gauge element 46, the extent of the uncoiling of the arcuate gauge element being in direct proportion to the pressure of the fluid.

Each jack consequently imposes its individual pressure upon its own column which in turn causes a stress to be applied to the corresponding gauge element 46. However, the plurality of gauge elements are rigidly connected to each other in side by side relation as shown in Figure 4 in order that they may function as a unit. This rigid connecting of the gauge elements may be effected in any desired manner, as for example by welding or braising the adjacent edges of the elements together, securing them to transverse cleats or the like. In any event, although the pressures of the various conduits 40 may vary, these different pressures are combined and produce a resultant movement of the assembly of elements 46.

A supporting plate 50 is attached to the stationary bracket or members 48 in any desired manner, and supports as by a pivot pin 52 a gauge actuating lever 54 whose end is pivotally connected at 56 to the assembly of units 46. The other end of the bent lever 54 is provided with a sector plate 58 constantly in mesh with a pinion 60 carried by a gauge shaft 62 suitably journaled and supported by the plate 50, and which carries an indicator or pointer 64 cooperating with the usual gauge indicia, not shown. Consequently, the operator can tell at a glance the total load supported by the truck body.

Each of the conduits 40 is provided with a conventional cut-off valve 66 and such valves may be arranged immediately adjacent the supporting bracket 44 as shown in Figures 1 and 3. These valves permit any individual hydraulic conduit to be temporarily disconnected from the gauge. A number of advantages arise from this construction, since all of the valves may be closed permitting the gauge to be removed for servicing without loss of hydraulic fluid; any individual conduit may be disconnected so as to obtain load readings from the connected conduits. The plurality of conduits possesses the further advantage that the total load carried by the hydraulic system is distributed over a number of individual supporting columns thereby lessening the strain on each column and enabling the same to be made of relatively lighter material.

In order to initially fill the system, or in the event that replenishing of the fluid is necessary, the same may be effected either by removing the cover 36 of the jack units, or by disconnecting the conduits 40 at the gauge or valves for obtaining access to the same.

Adjustment of clearance between the bolsters 18 and the frame members 12 may be effected by manipulating the adjusting screw 32 and lock nuts 34 of each of the jack units 28. It will be observed that when the truck body is tilted for dumping, the weight of the same is immediately removed from the hydraulic system, and connection with the hydraulic system by the body is instantly broken. Each time, however, that the body is lowered its weight is again imposed upon the system and relieved from the hinge pins 22.

It is contemplated that each of the hydraulic columns, jacks and gauge elements 46 shall constitute a separate and closed system wherein the fluid is permanently confined and sealed tending towards longer and more satisfactory service of the apparatus.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having thus described the invention, what is claimed as new is:

1. A pressure gauge comprising a plurality of arcuate, pressure responsive gauge members disposed in side by side contact with each other, means connecting each member to a separate hydraulic column for subjecting the member to loads imposed upon the associated column, said members being fixedly secured to each other along their contacting sides for movement as an assembly and a bracket mounted adjacent said gauge members, a gauge pointer movably mounted on said bracket, an actuating lever pivoted to said bracket and connected to said pointer, a link connecting said lever to said gauge assembly.

2. A pressure gauge comprising a plurality of arcuate, pressure responsive gauge members disposed in side by side contact with each other, means connecting each member to a separate hydraulic column for subjecting the member to loads imposed upon the associated column, said members being fixedly secured to each other along their contacting sides for movement as an assembly and a bracket mounted adjacent said gauge members, a gauge pointer movably mounted on said bracket, an actuating lever pivoted to said bracket and connected to said pointer, a link connecting said lever to said gauge assembly, control valves for each gauge member for controlling communication of the associated column therewith.

References Cited in the file of this patent

UNITED STATES PATENTS

| Number | Name | Date |
|---|---|---|
| 1,354,447 | Troll | Sept. 28, 1920 |
| 1,877,980 | Schafer | Sept. 20, 1932 |
| 1,949,855 | Averill | Mar. 6, 1934 |
| 2,472,689 | Adams et al. | June 7, 1949 |

FOREIGN PATENTS

| Number | Country | Date |
|---|---|---|
| 112,571 | Great Britain | Jan. 17, 1918 |
| 574,901 | France | Apr. 9, 1924 |
| 507,666 | Great Britain | June 20, 1939 |
| 726,233 | Germany | Oct. 9, 1942 |